United States Patent [19]
Alesi, Jr. et al.

[11] Patent Number: 5,133,276
[45] Date of Patent: Jul. 28, 1992

[54] FLOTATION UNITS

[75] Inventors: John Alesi, Jr., Fulton County; Robert L. Browning, DeKalb County, both of Ga.

[73] Assignee: Formex Manufacturing, Inc., Norcross, Ga.

[21] Appl. No.: 639,764

[22] Filed: Jan. 11, 1991

Related U.S. Application Data

[63] Continuation of Ser. No. 337,477, Apr. 13, 1989, abandoned, which is a continuation-in-part of Ser. No. 319,832, Mar. 3, 1989, abandoned, which is a continuation of Ser. No. 106,101, Oct. 7, 1987, abandoned.

[51] Int. Cl.⁵ .......................................... B63B 35/38
[52] U.S. Cl. .................... 114/263; 114/264; 114/267
[58] Field of Search ............... 114/265, 266, 255, 288, 114/292, 357, 61, 123, 263, 264, 267; 405/218, 219

[56] References Cited

U.S. PATENT DOCUMENTS

| | | |
|---|---|---|
| T.984,007 | 7/1979 | Richardson . |
| 2,976,577 | 3/1961 | Smith . |
| 2,991,965 | 7/1961 | Drieborg . |
| 3,073,274 | 1/1963 | Lamb .......................... 114/266 |
| 3,159,115 | 12/1964 | Nolan . |
| 3,192,099 | 6/1965 | Beckman et al. . |
| 3,208,421 | 9/1965 | Landes et al. ................ 114/292 |
| 3,242,245 | 3/1966 | Greig . |
| 3,250,660 | 5/1966 | Greig . |
| 3,289,621 | 12/1966 | Sebring . |
| 3,304,900 | 2/1967 | Greenwood ................. 114/292 |
| 3,323,151 | 6/1967 | Lerman . |
| 3,330,228 | 7/1967 | Donnelly . |
| 3,412,183 | 11/1968 | Anderson . |
| 3,511,191 | 5/1970 | Barry, Jr. et al. . |
| 3,521,588 | 7/1970 | Atlas .......................... 114/263 |
| 3,581,681 | 6/1971 | Newton . |
| 3,630,157 | 12/1971 | Ortenblad . |
| 3,699,902 | 10/1972 | Allgeyer et al. . |
| 3,702,100 | 11/1972 | Wharton . |
| 3,707,929 | 1/1973 | Lauffer . |
| 3,719,157 | 3/1973 | Arcocha et al. . |
| 3,752,102 | 8/1973 | Shuman . |
| 3,757,704 | 9/1973 | Alleyer et al. . |
| 3,760,754 | 9/1973 | Drummond . |
| 3,785,312 | 1/1974 | Schneider ................... 114/266 |
| 3,828,965 | 8/1974 | Yarbrough . |
| 3,832,955 | 9/1974 | Pottinger et al. . |
| 3,879,245 | 4/1975 | Fetherston et al. . |
| 3,910,747 | 10/1975 | Dean . |
| 3,914,101 | 10/1975 | Stefanka . |

(List continued on next page.)

FOREIGN PATENT DOCUMENTS

| | | |
|---|---|---|
| 3146381 | 6/1983 | Fed. Rep. of Germany . |
| 3038795 | 5/1985 | Fed. Rep. of Germany . |
| 8304536 | 4/1983 | France . |

OTHER PUBLICATIONS

Modern Plastics Encyclopedia at pp. 242–243 (1986–87).
"Expandable Polystyrene for Molded Foam," Plastic Engineering Handbook at pp. 534–546 (fourth edition).
Marina Dock Systems, "Boat & Motor Dealer" (Jul. 1986).
Promotional literature for the Follansbee Mod-U-Float.
Promotional literature for the Poly Float.
Promotional literature for the Follansbee Float Drum.
Promotional literature for the Dayton Float Drum.
Promotional literature for the Dura-Float.
Promotional literature for Follansbee Dock Systems.

Primary Examiner—Jesus D. Sotelo
Assistant Examiner—Stephen P. Avila
Attorney, Agent, or Firm—Kilpatrick & Cody

[57] ABSTRACT

A block of expanded polystyerene (EPS) foam is encapsulated with one or more plastic strips within a resilient shell of high molecular weight plastic such as polyethylene. The method and process utilizes heat and pressure (e.g., one hundred fifty tons) to seal and bond the foam in a protective cover with the seam fused together with all the strength and integrity of the original material. The units may be used as part of a dock flotation system.

12 Claims, 1 Drawing Sheet

U.S. PATENT DOCUMENTS

| | | |
|---|---|---|
| 3,914,103 | 10/1975 | Dean . |
| 3,914,104 | 10/1975 | Dean . |
| 3,970,024 | 7/1976 | Fisher . |
| 4,023,755 | 5/1977 | Alesi . |
| 4,094,110 | 6/1978 | Dickens et al. . |
| 4,142,471 | 3/1979 | Mustoe et al. . |
| 4,240,557 | 12/1980 | Dickens . |
| 4,241,555 | 12/1980 | Dickens et al. . |
| 4,284,447 | 8/1981 | Dickens et al. . |
| 4,295,236 | 10/1981 | Upchurch ............................. 114/357 |
| 4,418,634 | 12/1983 | Gerbus ................................ 114/263 |
| 4,548,775 | 10/1985 | Hayashi et al. . |
| 4,655,156 | 4/1987 | Svirklys . |
| 4,709,647 | 12/1987 | Rytand ................................. 114/263 |
| 4,804,347 | 2/1989 | Ross ..................................... 114/357 |
| 4,867,093 | 9/1989 | Sullivan . |
| 4,974,538 | 12/1990 | Meriwether ........................ 114/357 |
| 4,993,350 | 2/1991 | Pepper ................................. 114/292 |

FLOTATION UNITS

This application is a continuation of application Ser. No. 07/337,477, filed Apr. 13, 1989, now abandoned, which application is a continuation-in-part of application Ser. No. 07/319,832, filed Mar. 3, 1989, now abandoned, which application is a continuation of application Ser. No. 07/106,101, filed Oct. 7, 1987, now abandoned.

A block of expanded polystyerene (EPS) foam is encapsulated with one or more strips, such as plastic, within a resilent shell. The method and process utilizes heat and pressure (e.g., one hundred fifty tons) to seal and bond the foam in a protective cover with the seam fused together with all the strength and integrity of the original material.

The units may be used as part of a dock flotation system.

BACKGROUND OF THE INVENTION

Solid blocks of expended foam plastic have been used for many years to support docks, boathouses and the like on the water. Sometimes these units have been painted or sprayed with a coating. These flotation units have been attached to wooden decks and boathouses by various methods such as plastic straps, metal straps and various fasteners. It is a real problem attaching the flotation devices to other structures such as docks and boathouses and very often the attachment does not last very long. Sometimes it is necessary to drill a hole completely through a plastic block so as to install a threaded rod. Furthermore, such plastic units tend to be destroyed from use and are easily broken if struck by a boat or by rough weather. Encapsulation of plastic foam is a process previously known in other fields such as the transformer mounting pad disclosed in U.S. Pat. No. 4,023,755. The apparatus and procedure for thermoforming is previously known and disclosed in U.S. Pat. Nos. 3,914,103; 3,914,104 and 3,910,747 as well as application for U.S. letters patent Ser. No. 07/106,101. Various plastic units exist in the prior art which could be used as flotation device such as those disclosed in U.S. Pat. Nos. 3,511,191 and 3,581,681. Some of the plastic units are made by creating an open, hollow shell and pouring or injecting the foam materials inside. This is not the same as thermoforming by a vacuum and shrink forming procedures. The primary disadvantage of the previous units has been the difficulty in attaching the units to something else such as a boat dock or a deck. The present device provides a method of attaching the floats by means of strips of plastic such as polyethylene encapsulated inside the float. Then the float unit can be attached directly to a dock by bolting it in place with standard lag bolts.

SUMMARY OF INVENTION

A plastic float comprising a foam plastic material encapsulated between plastic sheets and having inside the unit a strip of material such as polymer material (e.g., polyethylene) that can be used for attaching the float directly to something else such as a dock by means of fasteners such as standard lag screws.

A primary advantage of the present device is in the means for attaching the flotation unit to some other surface such as a dock or a deck. Various other advantages are present in the use of the subject flotation device, such as: the recesses keep the banding straps secure; the straps will not cut into the foam or shell; there is a constant free board height; the aesthetic design blends into the landscape; the float is environmentally safe and will not pollute; the float will not sink even if pierced or cut; the polyethylene shell will not absorb water; the device is competitively priced; the device resists the damaging effects of ultraviolet rays, temperature and extremes in ice; the shell resists impacts and is impervious to most chemicals including gasoline, diesel fuel and oil. The unit may be used in fresh water or salt water and resists alegae and other marine organisms and would normally last the life of the average dock but will not be destroyed or eaten by wildlife and does not flake or rust. The present unit meets the new requirements of the U.S. Army Corps of Engineers Mobile District.

BRIEF DESCRIPTION OF THE DRAWINGS

Other and further objects and advantages of this invention will become apparent upon reading the following description of a preferred embodiment taken in conjunction with the accompanying drawings, in which.

DESCRIPTION OF A PREFERRED EMBODIMENT

Figure 1:
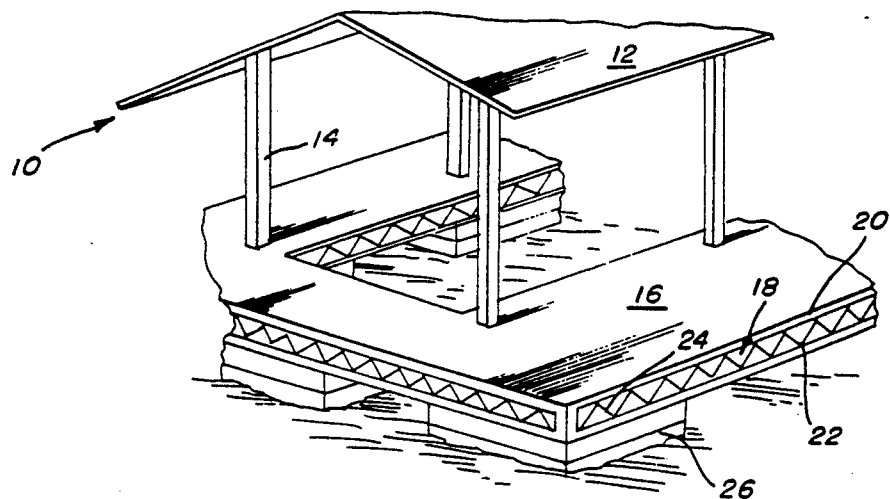
FIG. 1 is a perspective view illustrating one application of the present unit attached in place as part of a typical boat dock.
Figure 2:
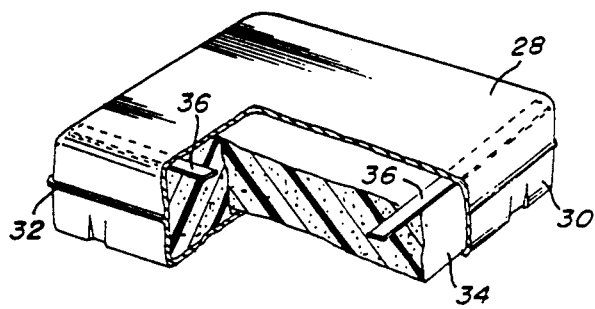
FIG. 2 is a partial prospective view of one of the plastic float units with the portion broken away to show the placement of the polyethylene strips around the periphery of the float.
Figure 3:
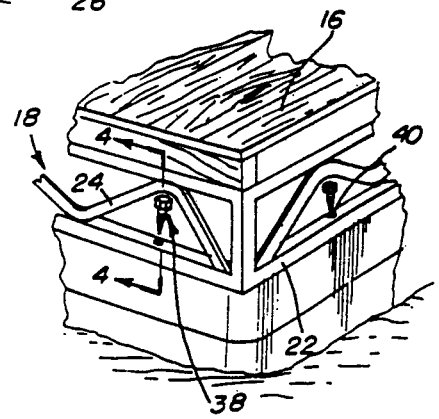
FIG. 3 is a partial prospective of a typical corner of the dock and overhead structure of FIG. 1 showing the placement of the lag screw.
Figure 4:
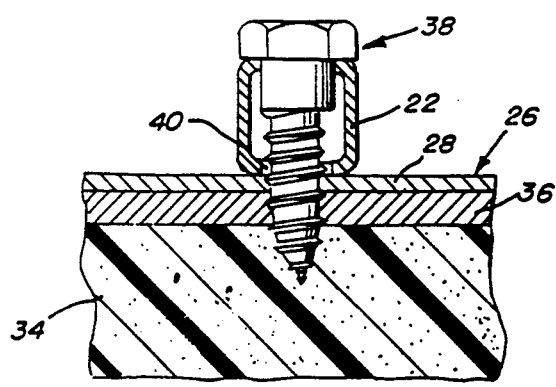
FIG. 4 is a cross-sectional view taken along lines 4—4 of FIG. 3 showing the components of a typical fastening assembly.

In FIG. 1 a typical boat dock 10 comprises a roof 12 supported by vertical posts 14 attached to a deck 16 supported on metal truss frame members 18 each comprising a top member 20 and a bottom member 22 connected together by diagonal braces 24. The dock is supported by a plurality of flotation units 26 each comprising an upper sheet 28 and a lower sheet 30 which have been joined and sealed at the peripherial edge 32 by means of the vacuum forming method and procedure set forth in the patents identified previously.

Each flotation unit comprises a block of expanded polystyene (EPS) foam 34 encapsulated within an outer shell formed by the top and bottom sheets 28, 30. The process for encapsulating the foam 34 involves the use of a slightly oversized block of EPS foam that is compressed inside two molded sheets, e.g. "Marlex" (Trademark) or other polyethylene plastic. The process, through heat and one hundred fifty tons of pressure, seals and bonds the foam 34 in a protective cover with a seam 32 fused together with all the strength and integrity of the original material. The finished part has a smooth, durable and permeable surface fully packed with foam and free from the voids and loose beads associated with "foam-filled" or "foamed-in-place" pontoons.

Encapsulated and incorporated inside each unit are four strips 36 of polyethylene (e.g. 0.300 inches thick × 2.5 inches wide × the length of the unit 26) that can be used for attaching the unit 26 directly to a dock member 22 by means of standard lag screws 38 which are inserted through respective holes 40 drilled in the members 22 of the dock 10 and through holes in the upper sheet 28 and through the strip 40 encapsulated in the unit. Although one or more strips 36 can be encapsulated anywhere inside the sheets 28, 30 and inside or outside the block 34 of foam material the most common and standard location for the four strips would be along the outer perimeter of the top side outside the block 34 and beneath top 28. This location allows the average metal frame of a dock to rest on the perimeter of the float 26 and be bolted directly to the float 26.

While I have shown and described the particular embodiment of this invention this is for purpose of illustration and does not constitute any limitation since various alterations, changes and deviations may be made in the embodiment without departing from the scope of the invention as defined only by proper interpretation of the appended claims.

We claim:

1. A floatation unit comprising:
   a. a closed shell comprising:
      i. a first section; and
      ii. a second section fused to the first section to form the shell;
   b. a buoyant material encapsulated within and rigidly bonded to the shell, thereby precluding movement of the buoyant material relative to the shell; and
   c. a plurality of members detached from each other and securely positioned wholly within the shell adjacent the buoyant material by the rigid bond between the buoyant material and the shell, for attaching the unit to a structure.

2. A flotation unit according to claim 1 in which the shell is made of a resilient polymer.

3. A flotation unit according to claim 1 in which the first section comprises a first protruding peripheral edge and the second section comprises a second protruding peripheral edge fused to the first peripheral edge to seal the first and second sections.

4. A flotation unit according to claim 1 in which the members are made of polyethylene.

5. A floatation unit according to claim 1 in which the buoyant material is a solid foam block.

6. A flotation unit according to claim 5 in which the foam block is made of expanded polystyrene.

7. A flotation unit according to claim 1 in which the plurality of members comprises at least four members positioned approximately quadrilaterally within the shell.

8. A flotation unit comprising:
   a. a resilient, closed polymer shell comprising:
      i. a first section having a first peripheral edge; and
      ii. a second section having an exterior surface, having a second peripheral edge fused to the first peripheral edge to seal the first and second sections and thereby form the shell, and defining means for securely receiving a strap for binding the unit to another structure, which means comprises a recess in the exterior surface;
   b. a buoyant material encapsulated within and rigidly bonded to the shell, thereby precluding movement of the buoyant material relative to the shell; and
   c. a member, positioned wholly within the shell and securely positioned by the shell adjacent the buoyant material, for directly fastening the unit to and buoying a non-buoyant dock.

9. A flotation unit according to claim 8 further comprising a plurality of members, each detached from one another and securely positioned by the shell adjacent the buoyant material.

10. A flotation unit according to claim 9 in which the members are made of polyethylene and are arranged approximately quadrilaterally within the shell.

11. A flotation unit according to claim 8 in which the buoyant material is a solid expanded polystyrene block and the member is made of polyethylene.

12. A flotation unit comprising:
   a. a resilient, closed polymer shell comprising:
      i. a first section having a first protruding peripheral edge; and
      ii. a second recessed section having a second protruding peripheral edge fused to the first peripheral edge to seal the first and second sections and thereby form the shell, which recess is adapted securely to receive a strap for binding the unit to a non-buoyant dock;
   b. a buoyant material comprising a solid expanded polystyrene block encapsulated within and rigidly bonded to the shell, thereby precluding movement of the buoyant material relative to the shell; and
   c. four polyethylene members detached from each other, securely positioned wholly within the shell along the perimeter of the buoyant material by the rigid bond between the buoyant material and the shell, and arranged approximately quadrilaterally within the shell, for directly fastening the unit to and buoying the dock.

* * * * *